JACOB B. VAN DYNE.

Improvement in Fire-Extinguishing Engines.

No. 127,390. Patented May 28, 1872.

Witnesses:
G. Mathys.

Inventor:
Jacob B. Van Dyne
Per
Attorneys.

127,390

UNITED STATES PATENT OFFICE.

JACOB B. VAN DYNE, OF LOUISVILLE, KENTUCKY.

IMPROVEMENT IN FIRE-EXTINGUISHING ENGINES.

Specification forming part of Letters Patent No. 127,390, dated May 28, 1872.

Specification describing an Improved Fire-Engine, invented by JACOB B. VAN DYNE, of Louisville, in the county of Jefferson and State of Kentucky.

The invention consists in arranging cylinders, provided with chemical ingredients which are mixed by the inversion of said cylinders, on pivots in the frame of a wheeled vehicle, and holding them in position by a latch. It also consists in providing the sides of frame with hooks upon which the ladders may be conveniently hung.

Figure 1:
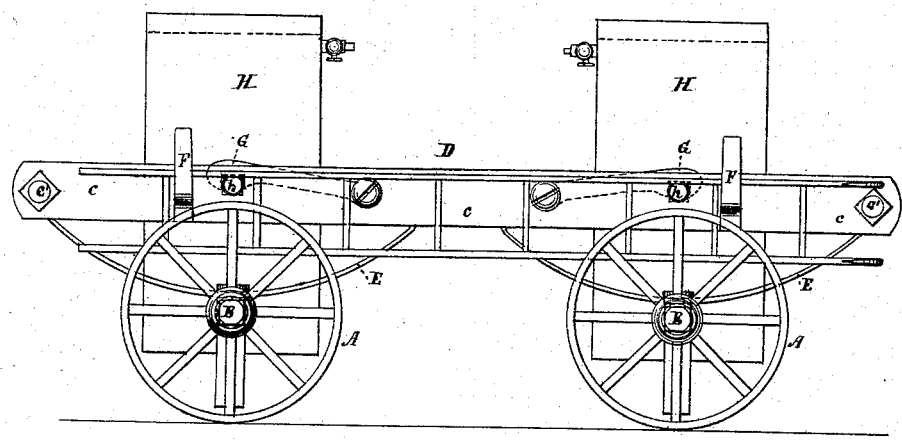
Figure 2:
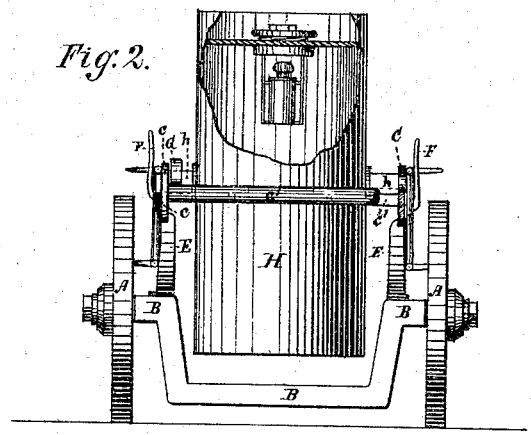

Figure 1 is a side elevation, and Fig. 2 an end view of my improved fire-engine.

A represents the wheels, B the downwardly-projecting axles, and C the frame of a carriage, D. The frame C rests upon four semi-elliptic springs, E, each centrally fastened to axle near the hub. This frame consists of the two sides $c\ c$ and two end pieces $c'\ c'$, which hold the sides together. On these side pieces are placed hooks F, which support, on the outside, ladders jointed or otherwise, while to the inside of said pieces are pivoted the latches G G. H H are two barrel-shaped fire-extinguishers, each having a capacity of fifty to one hundred gallons, and containing ingredients proportioned and mixed according to my patent issued April 9, 1872. The ingredients cannot mix, however, except by inverting the cylinders. Then the gases are generated, whose elastic pressure propels the liquid through the cock and hose into whatever direction desired. The cylinders H are each provided with trunnions $h\ h$, and journaled in the sides $c\ c$, so that they can be easily inverted when necessary. The pivoted latches G are fastened over the square trunnion $h$, and the cylinders held in position, as shown in drawing, until the operator is ready to discharge the chemical preparation upon the fire. The hose and pipe are then adjusted, the latches unhooked, the cylinders reversed, and the fire quickly put out.

Having thus described my invention, what I claim as new, and desire to secure by Letters Patent, is—

1. The chemical fire-extinguisher H, pivoted to the sides $c\ c$ of a wheeled vehicle, and held in position by latches G, as and for the purpose described.

2. The pieces $c'\ c'$ of a fire-engine, provided with hooks F on the outside, as and for the purpose set forth.

JACOB B. VAN DYNE.

Witnesses:
J. EUGENE BARNES,
JAMES R. W. SMITH.